Patented Mar. 1, 1927.

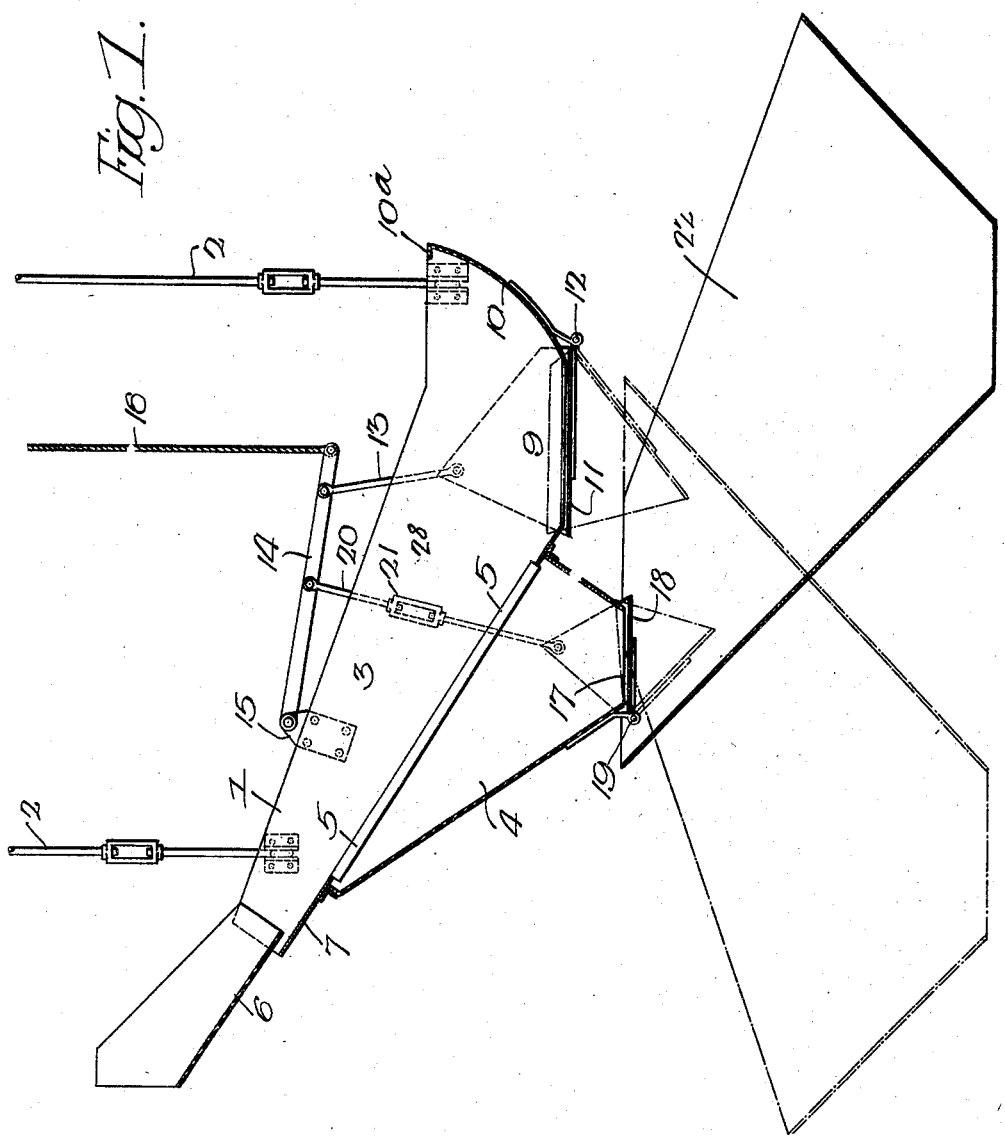

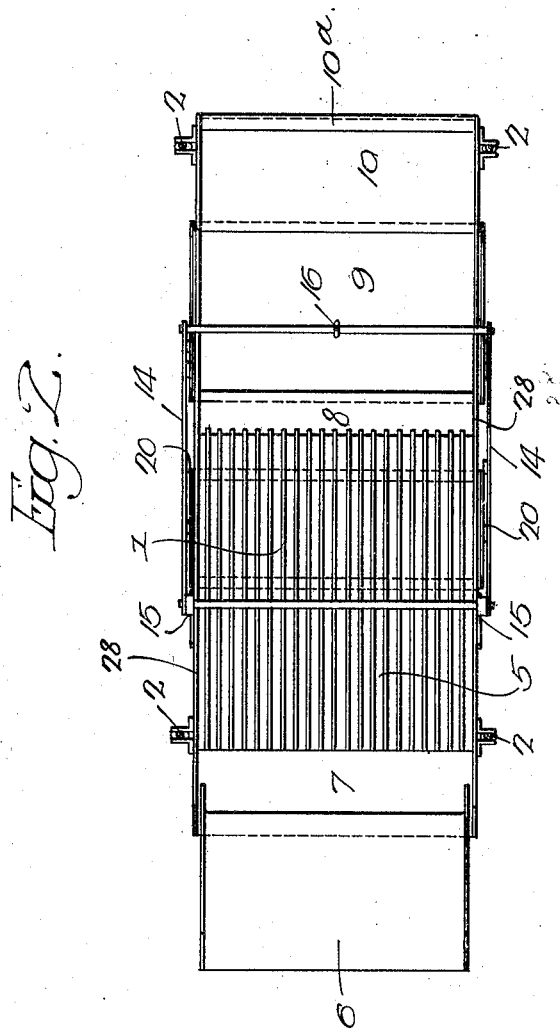

1,619,732

UNITED STATES PATENT OFFICE.

GEORGE S. JAXON, OF HUNTINGTON, WEST VIRGINIA, ASSIGNOR TO LINK-BELT COMPANY, OF CHICAGO, ILLINOIS, A CORPORATION OF ILLINOIS.

INSPECTION AND WEIGHING APPARATUS.

Application filed August 21, 1924. Serial No. 733,422.

My invention relates to certain improvements in inspection and weighing apparatus, in which coal, or other granular material, may be inspected and weighed.

One object of my invention is to construct such an apparatus so that the small sizes of coal may be separated from the larger sizes to allow inspection of the larger sizes and yet allow the entire mass of material to be weighed.

The invention also relates to certain details of construction by which the material can be discharged from the two compartments of the apparatus into a receiving hopper.

In the accompanying drawings:

Fig. 1 is a longitudinal sectional view of my improved inspection and weighing apparatus; and Fig. 2 is a plan view.

The inspection pan 1 is suspended from a scale beam by rods 2—2, which are pivotally connected to each end of the pan, as shown. There are four rods in the present instance, and these rods have turn-buckles by which the inclination of the pan can be varied to accommodate different materials. The pan is divided into two sections 3 and 4, which are separated by a screen 5. The screen forms the bottom of the upper section 3. This bottom is inclined, as shown, so that coal, or other granular material, discharged into the pan from a chute 6, flows over the screen to the discharge point at the opposite end of the pan from the chute. The screen, in the present instance, is made of a series of bars, spaced apart the proper distance to allow the fine particles of coal to pass through the screen and to retain the larger pieces in the section 3 so that they can be readily inspected for any foreign matter that may be present.

At the upper end of the pan is a dead plate 7 and at the lower end is a dead plate 8. Beyond the latter dead plate is a discharge opening 9. At the lower end of the pan is a curved end plate 10, preferably provided with a flange 10ª.

The sides 28 of the pan are extended to prevent the material overflowing.

The discharge opening 9 is closed by a gate 11, pivoted at 12 to the end plate 10. The gate 11 has side members to which are attached rods 13, which connect the gate to levers 14 pivoted to bearings 15 on the sides 11 of the pan. Attached to the levers is a rope 16, which passes around a drum on a scale beam (not shown.)

The bottom of the section 4 of the pan, under the screen, is inclined towards an opening 17, closed by a gate 18, pivoted at 19 to the bottom, as shown in Fig. 1. This gate is connected to the levers 14 by rods 20, having turnbuckles 21 so that the gate 18 can be adjusted to close with the gate 11.

A receiving hopper 22 is located under the pan in such position as to receive the material discharged from the two sections 3 and 4 of the pan, on opening the gates 11 and 18. The receiving hopper may be located in the position shown by dotted lines in Fig. 1, if desired.

Coal, or other material, is discharged from the chute 6 into the dead plate 7 of the inspection pan and flows over the screen 5. The larger particles are retained in the section 3, while the smaller particles pass through the screen into the section 4. When inspection has been completed and the weight of the material has been obtained, the gates are opened and the contents of the sections 3 and 4 are discharged into the receiving hopper 22 or other receptacle. The two gates are so located in respect to the receiving hopper that the finer material when being discharged will act as a cushion for the coarse material as it is discharged into the receiving hopper.

I claim:

1. The combination in an inspection and weighing apparatus, of a pan; means for suspending the pan, said pan being made in two sections separated by an inclined screen, each section having a discharge opening, the opening in the lower section being located directly in advance of the opening in the upper section; and a receiving hopper having an inclined portion over which the material flows as it is discharged from the sections of the pan, the coal discharged from one section acting as a cushion for that discharged from the other section.

2. The combination in inspection and weighing apparatus, of a suspended non-tilting pan made in two sections; an inclined screen located between the two sections, said screen retaining the material of larger size in the upper section and allowing the material of smaller size to pass to the other section; there being a space in the upper section of the pan at the base of the screen to allow the larger sizes of material to accumulate therein; a chute for discharging the material onto the screen; a gate at the bottom of each section, the gate for the lower section being in advance of the opening in the upper section; and a receiving hopper having an inclined portion over which the material flows from the two sections of the pan, the small size portions discharged from the lower section acting to cushion the course of the material discharged from the upper section.

3. The combination in inspection and weighing apparatus, of a pan; means for suspending the pan by its four corners, said pan being made in two sections, the bottom of each section being inclined; screen bars forming a portion of the bottom of the upper section, each section having a discharge opening at its lower end; a pivoted gate closing each opening; levers pivotally mounted on the pan; rods connecting the gates with the levers; and a receptacle into which both sections of the pan discharge material.

GEORGE S. JAXON.